April 21, 1953 F. S. ELSAESSER 2,635,561
NOZZLE FOR EXTRUDING DEVICES
Filed Jan. 9, 1947 2 SHEETS—SHEET 1
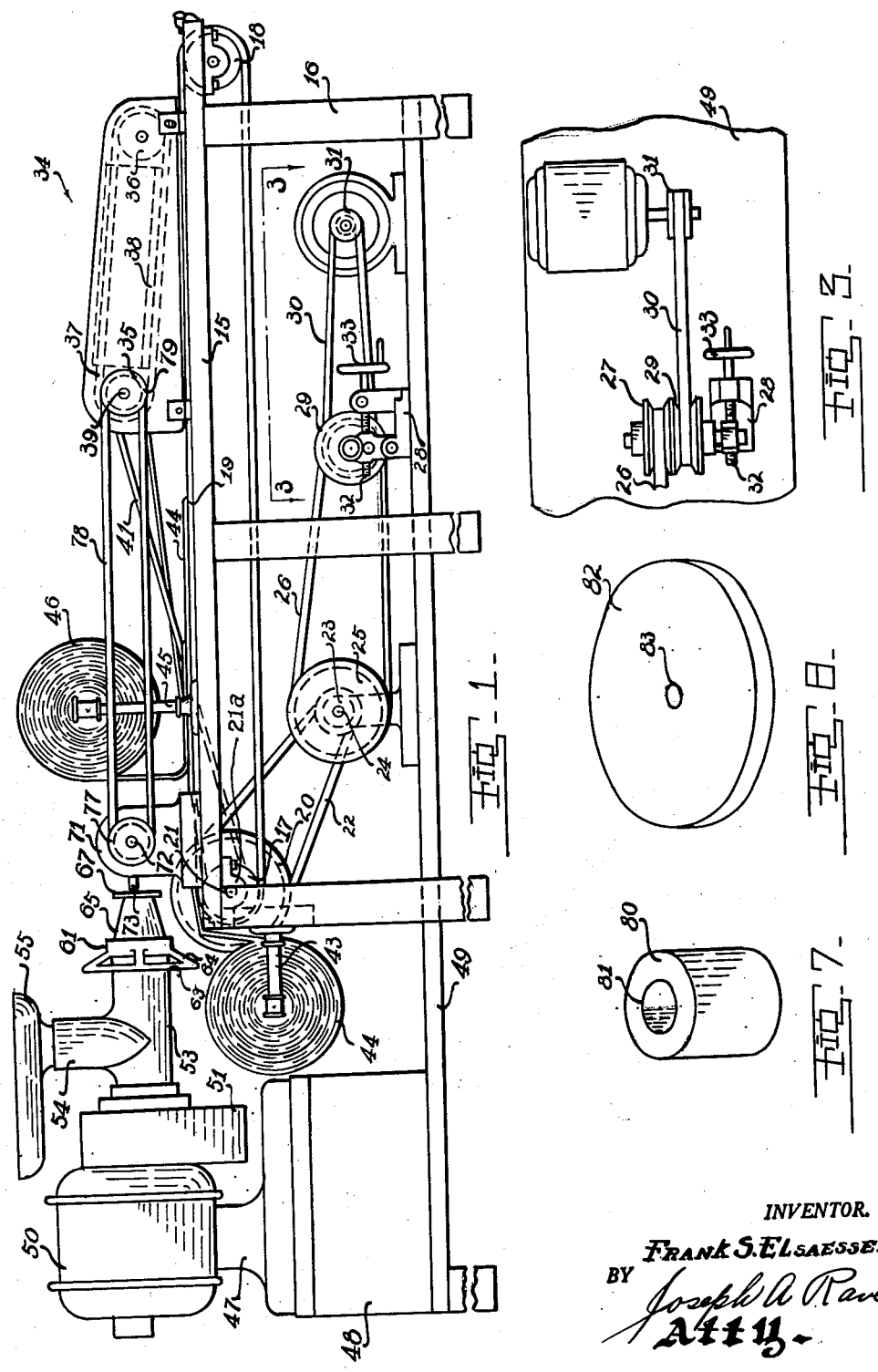
INVENTOR.
Frank S. Elsaesser
BY
Joseph A. Rave
Atty.

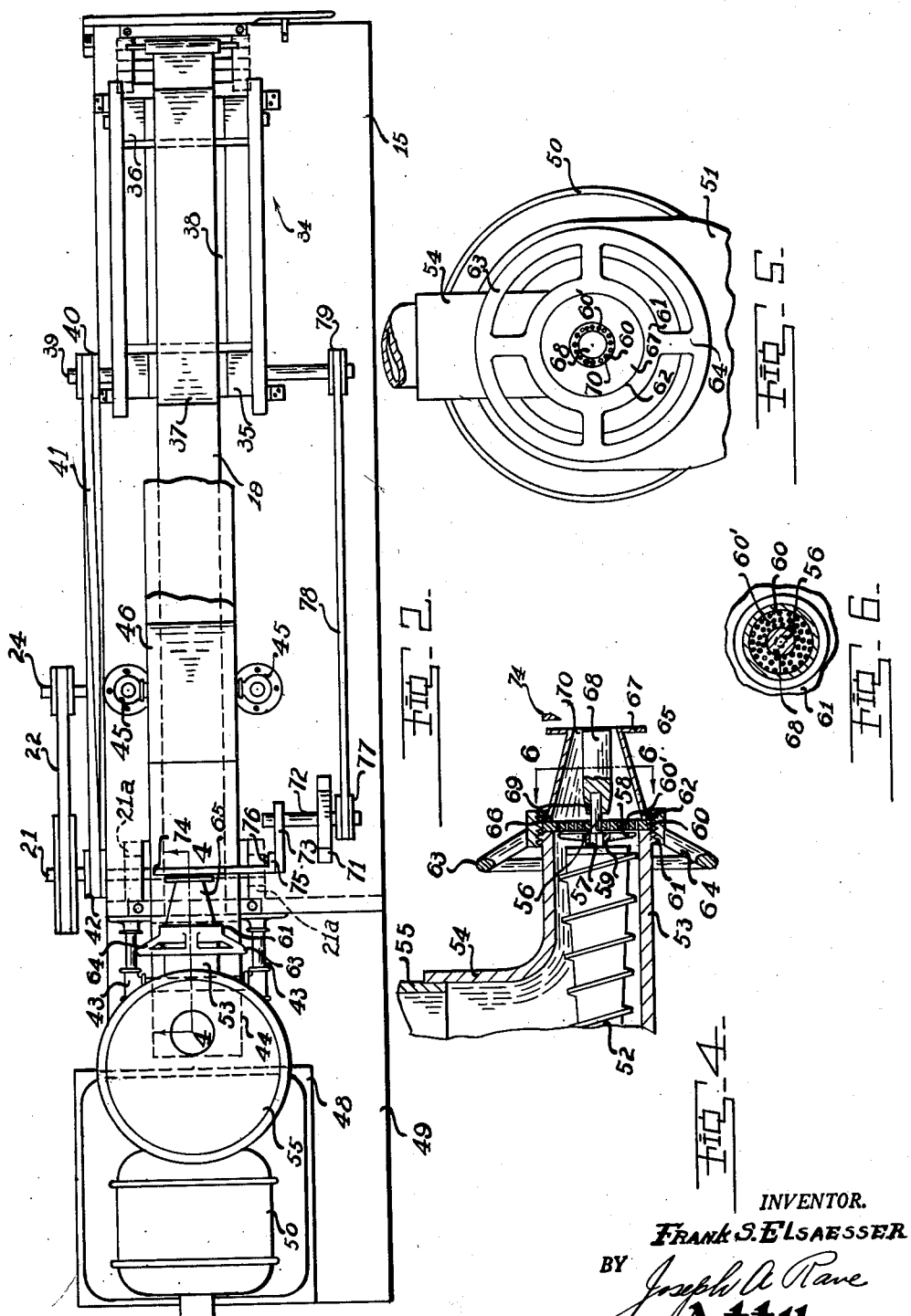

Patented Apr. 21, 1953

2,635,561

UNITED STATES PATENT OFFICE 2,635,561

NOZZLE FOR EXTRUDING DEVICES

Frank S. Elsaesser, Cincinnati, Ohio

Application January 9, 1947, Serial No. 721,128

4 Claims. (Cl. 107—14)

This invention relates to improvements in an extruding nozzle for food processing or forming machine.

In the manufacture of food products such as Hamburg steak patties, doughnuts, and the like, use is made of a raw food feeding mechanism relative to which a knife or dividing tool operates for dividing the raw food material into units prior to frying, cooking or other processing. In connection with the said feeding mechanism it is necessary to employ a nozzle which gives the final shape or form to the raw food product and, in the case of comminuted raw food compresses it to shape, and it is to such a nozzle that this invention is addressed. In food products that are to be subsequently processed, such as Hamburg steak patties that are to be flattened prior to the frying or cooking thereof, the thickness of the patties is critical since a thicker section at the center will result in the patties or the resulting Hamburg steak being not sufficiently fried or cooked at the center when the edges thereof are done or if the Hamburg steak is done in the center the edges are overdone.

It is, therefore, the principal object of the present invention to provide an extruding nozzle for food feeding means that will provide a quantity of a raw food product which will enable the said raw food product to be cooked uniformly.

Another object of this invention is the provision of a discharge or extrusion nozzle for raw food feeding means that will provide the divided portions of the raw food with a hole or aperture centrally thereof.

A still further object of the present invention is the provision of a nozzle for accomplishing the foregoing objects that is economical to manufacture yet highly efficient in operation.

A still further and specific object of the present invention is the provision of an extrusion nozzle for use with a meat grinder that supplies to the individual divided portions of the ground meat a central aperture so that the divided portion upon being flattened out will be no thicker or no denser at its middle than it is at its edges wherefore the resulting patty may be uniformly cooked or fried as Hamburg steak.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is an elevational view of a Hamburg steak patty forming machine having incorporated therewith the improvements of this invention.

Fig. 2 is a top plan view of the machine of Fig. 1.

Fig. 3 is a top plan view of a portion of the machine illustrating particularly, the drive mechanism thereof, as seen from line 3—3 on Fig. 1.

Fig. 4 is an enlarged fragmentary sectional view of the machine as seen from line 4—4 on Fig. 2.

Fig. 5 is an elevational view of a portion of the machine and particularly of the parts illustrated in Fig. 4.

Fig. 6 is a transverse sectional view through the extruding nozzle as seen from line 6—6 on Fig. 4.

Fig. 7 is a perspective of a divided portion of the raw meat product as it is extruded from the nozzle of the present invention.

Fig. 8 is a perspective view of the raw food product of Fig. 7 after it has passed through the patty forming or mashing mechanism of the Hamburg steak patty forming machine.

Throughout the several views of the drawings similar reference characters are employed to denote the same or similar parts.

As was noted above this invention has particular reference to an extrusion nozzle utilized with feeding devices for feeding raw products such as dough in the form of doughnuts and ground meat in the formation of Hamburg steak patties.

The invention is illustrated in the drawings in connection with a Hamburg steak patty forming machine and will be so described, but it is to be understood that the invention is not limited to a machine for forming Hamburg steak patties. The machine illustrated in the drawings is also disclosed in applicant's co-pending application Serial No. 711,083 filed on November 20, 1946, issued March 27, 1951, as Patent No. 2,546,497.

Specifically, the machine illustrated in the drawings comprises a table 15 at the upper ends of legs or other supports 16. Mounted in spaced apart relation to one another on the table 15 are driving and driven drums 17 and 18 about which passes conveyor belt 19.

Any suitable or desirable means may be employed for driving the drum 17 and thereby actuating the conveyor belt 19, which driving means, as shown in the drawings, comprises a pulley 20 on the end of driving drum shaft 21. The driving drum shaft 21 is rotatably mounted in suitable bearings 21a depending from the under side of the table 15, adjacent one end thereof, with said shaft inwardly of the left-hand rear leg and having its end projecting therebeyond to receive the pulley 20, see Fig. 2. Trained about the pulley 20 is a belt 22 which in turn extends about a pulley 23 on intermediate or counter shaft 24. Carried by the counter shaft 24 is a second pulley 25 having trained thereabout a belt or other transmission device 26. The belt 26 extends about one pulley 27 of a speed control mechanism 28 which has a second pulley 29 driven by a belt 30 from the motor pulley 31. The speed changing mechanism 28 is of a well known construction and operates by varying the effective diameters of pulley 27 and 29 relatively to one another, and which variation is accomplished by the screw 32 operable through the hand wheel 33.

Mounted on the table 15 near the discharge end of the machine is a flattening or mashing mechanism indicated in general by the reference numeral 34. The flattening mechanism 34 comprises a pair of side frames wherein is mounted a driving and a driven drum 35 and 36 about which is trained an endless belt 37. The drums 35 and 36 are spaced different amounts above the conveyor belt 19 whereby a contracting throat results between the belt 37 and conveyor belt 19 as clearly illustrated in Fig. 1 and described in the above identified co-pending application.

The function of the belt is to reduce the quantity of ground meat brought to it to a patty so that the patty may be suitably cooked or fried. In order to effect the reduction of the quantity of ground meat to a patty the lower reach of the belt 37 is backed up by a backing member or buck board 38 carried by the aforementioned side frames.

In order that the said quantity of ground meat may be adequately moved while being flattened, the lower reach of the belt 37 and the upper reach of the conveyor belt 19 are driven and preferably in the same longitudinal direction, namely, from left to right as seen in Fig. 1. In order to do this the driving drum 35 has its shaft 39 projecting rearwardly of the flattening mechanism to receive a pulley 40 about which is trained a transmission belt 41. The belt 41 is further trained about a pulley 42 on the conveyor belt driving drum shaft 21 as seen in Figs. 1 and 2. The belt 41 is twisted wherefore clockwise rotation of the conveyor belt driving drum 21 is changed to counterclockwise rotation of the flattening mechanism driving drum shaft 39.

Mounted at the head end of the machine and conveniently to the legs or supports 16 at said head end of the machine are arms 43 which support for rotation a roll of paper 44 and which paper is adapted to be disposed on the upper surface of the conveyor belt 19. As will later be made clear it is the paper layer 44 that receives the divided portions or quantities of ground meat and supports the same as they are being carried to and through the flattening or masher mechanism.

Supported by the table 15 at a point intermediate the head end thereof and the flattening device 34 are upstanding arms 45 which support a paper roll 46 that is adapted to overlie the divided quantities of ground meat prior to and during the movement thereof to and through the flattening mechanism 34.

Forwardly of the head end of the machine is the meat grinder which may be considered as illustrative of any raw food feeding device. The said meat grinder comprises a stand 47 disposed on a suitable support 48 at the said head end of the machine and may conveniently be disposed on a shelf or the like 49 which may be also the support for the counter shaft, speed changing device, and motor previously referred to. The meat grinder stand 47 has integral therewith or otherwise secured thereto a motor 50 which through a suitable reduction gearing 51 rotates or actuates the food product feeding screw 52 located within a housing 53. The housing 53 includes a filling or supply tube or sleeve 54 with which is usually associated a tray 55 to hold the meat or other food product to be fed by the screw 52. At the forward end of the screw 52 its shaft 56 is provided with a section 57 of angular cross section and it is on this portion 57 of the feed screw shaft that the cutter 58 is mounted. The cutter 58 is usually provided with a hub 59 having a central opening or aperture of a cross section corresponding to the cross section of the shaft portion 57 wherefore they rotate as a unit. Forwardly of the cutter 58 is the dividing plate 60 provided with a series of comparatively small apertures 60' to further cut or shred the meat, and the plate 60 along with the cutter 58 combine to comminute the meat in the formation of ground meat as used in making Hamburg steaks.

As illustrated in the drawings the plate 60 is butted against the forward end of the housing 53 and is held in operative position by a nut 61 threaded on the exterior of the said housing 53, the nut 61 having an inwardly projecting radial flange 62 that overlies the peripheral edge of the plate 60 in holding same in operative relation. Any suitable or desirable means may be provided through which the nut 61 is to be operated, that shown in the drawings comprising a hand wheel 63 connected to the nut 61 by radial arms 64.

Forwardly of the divider plate 60 is the extruding nozzle 65 which has a body portion circular throughout its length but in the form of a cone having an enlarged inlet base portion which is provided with an outwardly disposed radial flange 66 adapted to be positioned between the inwardly projecting flange 62 of the nut 61 and the peripheral edge of the dividing plate 60. The discharge or outer end of nozzle 65 is likewise provided with an outwardly projecting radial flange 67 which acts as a guard for the food product dividing blade or knife as will later be made clear.

The feed screw shaft 56 projects forwardly of the dividing plate 60 and has connected therewith a core forming element 68. Any suitable or desirable means may be employed for attaching the core forming element 68 to the shaft 56, that illustrated in the drawings consisting in supplying the core forming element 68 with a socket to receive the shaft 56 and the attachment of which is effected by a set screw or dog screw 69 carried by the element 68 for impingement on the shaft 56.

From the foregoing it will be understood that there is provided an outlet or ring like formation at the end of the extruding nozzle 65 and said outlet is indicated by the reference numeral 70 and more clearly illustrated in Fig. 5.

It will further be noted that the conical formation of the nozzle body effects a compression of the food product as it passes from the intake end to the outlet end thereof, wherefore the food product has its density increased and controlled.

It will of course be understood that the movement of the food product through the nozzle 65 is effected by the feed screw 52 in forcing the food product from the housing 53 through the comminuting plate 60 into and through the nozzle 65. The extrusion of the food product through the outlet 70 is a continuous one so long as the food product is being fed into the tube or sleeve 54.

It will be understood that the stream of the food product from the outlet 70 of the nozzle 65 is to be divided into usable quantities, such for example, as a sufficient amount of dough to form a single doughnut or a sufficient amount of quantity of ground meat to form a Hamburg steak patty. As illustrated in the drawings, and to accomplish this step, the table 15 supports and has upstanding therefrom a bearing 71 in which is rotatably mounted a shaft 72. The shaft 72 projects through the bearing 71 and that portion between the bearing and conveyor belt 19 has secured thereto an arm 73 supporting at its outer end a divider element or knife blade 74. The attachment of the divider element or knife blade 74 to the arm 73 may be occasioned in any suitable or desirable manner such as by a flange 75 at the inner end of the blade 74 through which the attaching means, bolts 76, extend into the arms 73.

In order that the arm 73 and its shaft 72 may be actuated to effect the movement of the divider element or knife blade 74 relative to the nozzle 75 the said portion of the shaft 72, projecting outwardly of the bearing 71, has keyed or otherwise secured thereto a pulley 77 about which is trained a transmission element or belt 78 that, in turn, extends about a pulley 79, on an extending portion of the flattening mechanism driving drum shaft 39.

It is believed the operation of the mechanism is obvious from the foregoing description of the elements thereof since the continuously extruding stream from the nozzle discharge opening 70 is being constantly subdivided and the subdivided portions fall onto the paper 44 and push the said paper against the conveyor belt 19 which, since it is constantly moving, carries the subdivided portions of the ground meat to and through the flattening or mashing mechanism 34. However prior to the entry of the ground meat into the throat of the flattening or mashing mechanism the said ground meat picks up the paper 46 which adheres thereto due to the inherent stickiness of ground meat. The ground meat is therefore conveyed through the flattening or mashing mechanism with paper above and beneath it so that the flattening or mashing is effected between said papers and thereby prevented from contact with any other element.

The ground meat upon being divided from the stream has the form substantially illustrated in Fig. 7 and is substantially ring-like as indicated at 80 with an air core or hole 81. It is in this form that the ground meat enters the flattening mechanism throat and emerges therefrom beyond the driven drum 36 as a disk 82 see Fig. 8. In this form of disk the air core 81 has been materially reduced as illustrated at 83 and in fact may have been completely eliminated. In the process of flattening the ground meat was caused to be spread radially both outwardly and inwardly of its axis since the hole or air core 81 offered no resistance to such spreading. It is for this reason that the resulting Hamburg steak patty can be more uniformly cooked or fried since the cross section and density of the patty is thus made uniform instead of having a solid center which resists flattening or spreading of the ground meat except as the same may spread outwardly and radially of the said center.

What is claimed is:

1. In a device of the class described, the combination of a housing having a discharge end, a feed screw centrally of the housing and terminating at the discharge end of the housing, a shaft integral with and projecting forwardly of the feed screw, a comminutor at the discharge end of the housing ahead of the feed screw and received on the feed screw shaft, a discharge nozzle ahead of the comminutor comprising a hollow conically shaped body portion with the larger end as the entrant and the smaller end as the discharge, a radially, outwardly projecting mounting flange at the entrant end of the nozzle, said nozzle mounting flange contacting the comminutor at the perimeter thereof, a nut screwed on the housing and having a radially, inwardly projecting flange for engagement with the outwardly projecting nozzle flange for securing the comminutor and nozzle in position, and a core element having a socket in one end mounted on and secured to the feed screw shaft to be substantially central of the comminutor and project axially of the nozzle body portion with said core element of substantially uniform diameter from end to end for cooperation with the said nozzle body portion conical wall in compressing the comminuted particles within the nozzle and prior to the discharge thereof, said feed screw shaft projecting through said comminutor to receive thereon the socket in said core element.

2. In a device of the class described, the combination of a housing having a discharge end, a feed screw centrally of the housing and terminating at the discharge end of the housing, a shaft integral with and projecting forwardly of the feed screw, a comminutor at the discharge end of the housing ahead of the feed screw and received on the feed screw shaft, a discharge nozzle ahead of the comminutor comprising a hollow conically shaped body portion with the larger end as the entrant and the smaller end as the discharge, a radially, outwardly projecting mounting flange at the entrant end of the nozzle, said nozzle mounting flange contacting the comminutor at the perimeter thereof, a nut screwed on the housing and having a radially, inwardly projecting flange for engagement with the outwardly projecting nozzle flange for securing the comminutor and nozzle in position, a core element having a socket in one end mounted on and secured to the feed screw shaft to be substantially central of the comminutor and project axially of the nozzle body portion with said core element of substantially uniform diameter from end to end for cooperation with the said nozzle body portion conical wall in compressing the comminuted particles within the nozzle and prior to the discharge thereof, said feed screw shaft projecting through said comminutor to receive thereon the socket in said core element, and means forwardly of the discharge end of the nozzle for severing the compressed comminuted particles into predetermined quantities as said compressed comminuted particles are discharged.

3. In a device of the class described, the combination of a housing having a discharge end, a feed screw centrally of the housing and terminating at the discharge end of the housing, a shaft integral with and projecting forwardly of the feed screw, a comminutor at the discharge end of the housing ahead of the feed screw and received on the feed screw shaft, a discharge nozzle ahead of the comminutor comprising a hollow conically shaped body portion with the larger end as the entrant and the smaller end as the discharge, a radially, outwardly projecting mounting flange at the entrant end of the nozzle, said nozzle mounting flange contacting the comminutor at the perimeter thereof, a nut screwed on the housing and having a radially, inwardly projecting flange for engagement with the outwardly projecting nozzle flange for securing the comminutor and nozzle in position, a core element having a socket in one end mounted on and secured to the feed screw shaft to be substantially central of the comminutor and project axially of the nozzle body portion with said core element of substantially uniform diameter from end to end for cooperation with the said nozzle body portion conical wall in compressing the comminuted particles within the nozzle and prior to the discharge thereof, means forwardly of the discharge end of the nozzle for severing the compressed comminuted particles into predetermined quantities as said compressed comminuted particles are discharged, and a radial, outwardly projecting flange on the nozzle at its discharge end to act as a guard-guide for the severing means.

4. In a device of the class described, the combination of a housing having a discharge end, a feed screw centrally of the housing and terminating at the discharge end of the housing, a shaft integral with and projecting forwardly of the feed screw, a comminutor at the discharge end of the housing ahead of the feed screw and received on the feed screw shaft, a discharge nozzle ahead of the comminutor comprising a hollow conically shaped body portion with the larger end as the entrant and the smaller end as the discharge, a radially, outwardly projecting mounting flange at the entrant end of the nozzle, said nozzle mounting flange contacting the comminutor at the perimeter thereof, a nut screwed on the housing and having a radially, inwardly projecting flange for engagement with the outwardly projecting nozzle flange for securing the comminutor and nozzle in position, a core element having a socket in one end mounted on and secured to the feed screw shaft to be substantially central of the comminutor and project axially of the nozzle body portion with said core element of substantially uniform diameter from end to end for cooperation with the said nozzle body portion conical wall in compressing the comminuted particles within the nozzle and prior to the discharge thereof, means forwardly of the discharge end of the nozzle for severing the compressed comminuted particles into predetermined quantities as said compressed comminuted particles are discharged, a radial, outwardly projecting flange on the nozzle at its discharge end to act as a guard-guide for the severing means, and means for receiving the severed portions of the extruded comminuted particles for transporting the same from the vicinity of the discharge nozzle.

FRANK S. ELSAESSER.

References Cited in the file of this patent

UNITED STATES PATENTS

| Number | Name | Date |
|---|---|---|
| 523,116 | Gelinck | July 17, 1894 |
| 902,088 | Kintner | Oct. 27, 1908 |
| 918,195 | Pooley | Apr. 13, 1909 |
| 1,265,854 | Wixey | May 14, 1918 |
| 1,444,041 | Schulz et al. | Feb. 6, 1923 |
| 1,577,336 | Marsden | Mar. 16, 1926 |
| 2,026,526 | Gipe | Jan. 7, 1936 |
| 2,090,095 | Bainbridge | Aug. 17, 1937 |
| 2,209,824 | Louisot et al. | July 30, 1940 |
| 2,217,135 | Parrish et al. | Oct. 8, 1940 |
| 2,291,212 | Clinefelter | July 28, 1942 |